US011897435B1

(12) United States Patent
Herse

(10) Patent No.: US 11,897,435 B1
(45) Date of Patent: Feb. 13, 2024

(54) PARALLEL MOTION WINDOW WIPER IN AN AUTONOMOUS VEHICLE

(71) Applicant: GM Cruise Holdings LLC, San Francisco, CA (US)

(72) Inventor: Nathaniel Herse, San Francisco, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 0 days.

(21) Appl. No.: 17/882,428

(22) Filed: Aug. 5, 2022

(51) Int. Cl.
*B60S 1/34* (2006.01)
*B60S 1/48* (2006.01)
*B60S 1/08* (2006.01)

(52) U.S. Cl.
CPC ........... *B60S 1/3406* (2013.01); *B60S 1/0818* (2013.01); *B60S 1/482* (2013.01)

(58) Field of Classification Search
CPC ...... B60S 1/34; B60S 1/56; B60S 1/24; B60S 1/482; B60S 1/0818; B60S 1/3406

USPC ........................................................ 15/250.3
See application file for complete search history.

(56) References Cited

U.S. PATENT DOCUMENTS

| 6,393,653 B1* | 5/2002 | Harris ..................... B60S 1/185 74/42 |
| 2023/0001889 A1* | 1/2023 | Caillot ..................... B60S 1/08 |

* cited by examiner

*Primary Examiner* — Katina N. Henson
(74) *Attorney, Agent, or Firm* — Akona IP PC

(57) ABSTRACT

Examples of the present disclosure provide an apparatus comprising: a wiper assembly and a sensor assembly. The wiper assembly may include: a linkage assembly; a wiper blade removably attached to the linkage assembly; and a actuator coupled to the linkage assembly and configured to enable rotation of the linkage assembly around a shaft. The sensor assembly may include: a plurality of optical sensors arranged along a linear axis; and a window between the plurality of optical sensors and the wiper assembly. The wiper blade is longitudinally oriented parallel to the linear axis, and the wiper blade is configured to translate in a direction perpendicular to the linear axis while maintaining contact with the window during translation.

20 Claims, 5 Drawing Sheets ial sensors.

PARALLEL MOTION WINDOW WIPER IN AN AUTONOMOUS VEHICLE

BACKGROUND

1. Technical Field

The present disclosure generally relates to wiper systems and, more specifically, a parallel motion window wiper in an autonomous vehicle.

2. Introduction

An autonomous vehicle (AV) is a motorized vehicle that can navigate without a human driver or with minimal human input. An exemplary AV can include various sensors, such as a camera sensor, a light detection and ranging (LIDAR) sensor, and a radio detection and ranging (RADAR) sensor, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at fixed locations on the AVs.

BRIEF DESCRIPTION OF THE DRAWINGS

The various advantages and features of the present technology will become apparent by reference to specific implementations illustrated in the appended drawings. To facilitate this description, like reference numerals designate like structural elements. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
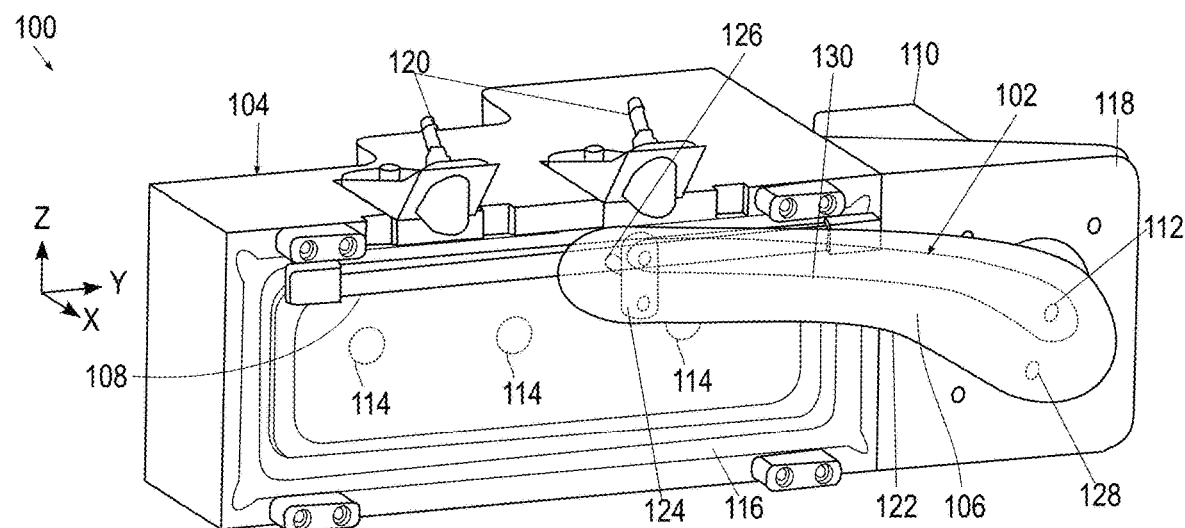
FIG. 1 illustrates a simplified perspective view of an example apparatus for a parallel motion window wiper in an AV.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The terms "substantially," "close," "approximately," "near," and "about," generally refer to being within +/−20% of a target value (e.g., within +/−5% or 10% of a target value) based on the context of a particular value as described herein or as known in the art.

Terms indicating orientation of various elements, e.g., "coplanar," "perpendicular," "orthogonal," "parallel," or any other angle between the elements, generally refer to being within +/−5%-20% of a target value based on the context of a particular value as described herein or as known in the art.

The term "connected" means a direct mechanical connection between the things that are connected, without any intermediary devices, while the term "coupled" means either a direct connection between the things that are connected, or an indirect connection through one or more passive or active intermediary devices.

An AV contains within it many integrated circuit (IC) devices such as microprocessors, microcontrollers, and the like. These IC devices perform various functions that serve to allow the AV to operate without a human driver or with little human assistance. One of the ways in which AVs operate is by the use of sensors, including optical sensors such as cameras and LIDARs. The optical sensors are part of a suite of sensors that work with an on-board computer to map the local environment and steer the AV through a dynamic environment that contains traffic signals, pedestrians, other cars, tractor trailers, animals, and obstructions of various kinds. Indeed, AVs must be able to 'see' their environment to operate without failure, detect other vehicles on the road, stop for pedestrians, and handle any unexpected circumstances they may encounter. Examples of optical sensors include cameras and LIDARs of various types.

However, such optical sensors, like human eyes, have limited capabilities in conditions of low visibility. For example, cameras rely on ambient light, which varies widely with weather and time of day. Their fields of view may become dirty with mud and debris, or they may face low visibility due to environmental factors, such as rain and fog. Dirt and debris on the lens of the optical sensors can affect the performance of such sensors. Dirt (even in the corners of the window) can deflect/bounce rays and create a multi-path problem inside the assembly, which can lead to incorrect LIDAR readings of depth. Thus, being able to clean the window fully and well to avoid dirt in the corners of the window as also elsewhere on the surface of the window would make a difference in the performance of the optical sensors. Some solutions to this problem may be to use conventional windshield wipers to wipe the windows of these optical sensors. However, the windows used with optical sensors may not have the form factor of conventional windshields. In particular, they may be narrow and wide, which may prevent traditional wipers with arc-shaped patterns from operating effectively.

Accordingly, examples of the present disclosure provide an apparatus comprising: a wiper assembly and a sensor assembly. The wiper assembly may include: a linkage assembly; a wiper blade removably attached to the linkage assembly; and an actuator coupled to the linkage assembly and configured to enable rotation of the linkage assembly around a shaft. The sensor assembly may include: a plurality of optical sensors arranged along a linear axis; and a window between the plurality of optical sensors and the wiper assembly. The wiper blade is longitudinally oriented parallel to the linear axis, and the wiper blade is configured to translate in a direction perpendicular to the linear axis while maintaining contact with the window during translation.

In some examples, instead of a conventional crank arm mechanism that wipes out an arc shape as in traditional windshield wipers, a parallel four-bar mechanism can be used to make the wiper blade stay at a fixed angle (without rotation) and wipe a nearly rectangular pattern with a narrow aspect ratio. Instead of using a basic four-bar mechanism with all the links exposed, one of the links may operate as a housing that covers and/or hides the matching link and additional short link inside the housing. This produces a parallel motion with a rotating driving arm while the mechanism of the motion remains hidden and protected under the housing.

In the drawings, same reference numerals refer to the same or analogous elements/materials shown so that, unless stated otherwise, explanations of an element/material with a given reference numeral provided in context of one of the drawings are applicable to other drawings where element/materials with the same reference numerals may be illustrated. Further, the singular and plural forms of the labels may be used with reference numerals to denote a single one and multiple ones respectively of the same or analogous type, species, or class of element.

Furthermore, in the drawings, some schematic illustrations of example structures of various devices and assemblies described herein may be shown with precise right angles and straight lines, but it is to be understood that such schematic illustrations may not reflect real-life manufacturing limitations which may cause the features to not look so "ideal" when any of the structures described herein are examined minutely. Note that in the figures, various components are shown as aligned merely for ease of illustration; in actuality, some or all of them may be misaligned. Further, the figures are intended to show relative arrangements of the components within their assemblies, and, in general, such assemblies may include other components that are not illustrated (e.g., various other components related to electrical functionality, or thermal mitigation). For example, in some further examples, the assembly as shown in the figures may include more electrical or thermomechanical components. Additionally, although some components of the assemblies are illustrated in the figures as being planar rectangles or formed of rectangular solids, this is simply for ease of illustration, and examples of these assemblies may be curved, rounded, or otherwise irregularly shaped as dictated by and sometimes inevitable due to the manufacturing processes used to make various components.

For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 112a-112e), such a collection may be referred to herein without the letters (e.g., as "112").

FIG. 1 illustrates a simplified perspective view of an example apparatus 100 for a parallel motion window wiper in an AV. Apparatus 100 comprises: a wiper assembly 102 and a sensor assembly 104. Wiper assembly 102 includes a linkage assembly 106, a wiper blade 108 removably attached to linkage assembly 106, and an actuator 110 coupled to linkage assembly 106 and configured to enable rotation of linkage assembly 106 around a shaft 112. In various embodiments, actuator 110 may comprise a rotary motor coupled to shaft 112. Sensor assembly 104 may include one or more optical sensors 114 arranged along a linear axis (e.g., Y-axis in the orientation shown in the figure), and window 116 between plurality of optical sensors 114 and wiper assembly 102. In many examples, optical sensors 114 comprise optical cameras; in other examples, optical sensors 114 comprise LIDAR sensors; in yet other examples, optical sensors 114 comprise both optical cameras and LIDAR sensors. Some optical cameras may be fish-eye cameras with wide fields of view; other optical cameras may have conventional lens. Any suitable type of cameras and LIDAR sensors may be used in optical sensors 114 within the broad scope of the disclosure herein. Note that only three optical sensors 114 are shown merely for ease of illustration. Any number of optical sensors 114 may be included in various examples within the broad scope of the disclosure herein. Window 116 may comprise optically transparent glass or plexiglass or other suitable material in some examples. In other examples, window 116 may comprise a lens (e.g., capable of focusing light to a focal point). In yet other examples, window 116 may comprise a material transparent to the specific electromagnetic radiation applicable for one or more optical sensors 114.

In many examples, wiper blade 108 is longitudinally oriented parallel to the linear axis (e.g., Y-axis), and wiper blade 108 is configured to translate in a direction (e.g., Z-axis) perpendicular to the linear axis (e.g., Y-axis) while maintaining contact with window 116 during translation. Wiper blade 108 may be substantially as long as window 116 is wide. For example, window 116 may be approximately 5-6 inches wide; wiper blade 108 in such examples may correspondingly be approximately 5-6 inches in length. Window 116 may be approximately half as tall as it is wide in some examples. In some such examples, window 116 may be approximately 2.5 to 4 inches tall; in such examples, wiper blade 108 may traverse a distance of approximately 2.5 to 4 inches along the Z-axis perpendicular to the linear Y-axis. In many examples, actuator 110 is enclosed within a chassis 118, which is immobile relative to wiper assembly 102. Actuator 110 may further be attached to chassis 118 appropriately.

Apparatus 100 may comprise nozzles 120 configured to spray fluid on window 116. In some examples, the fluid may be any suitable type of cleaning fluid, such as liquids comprising methanol, ethylene glycol, antifreeze, ethanol, detergents, etc. Nozzles 120 may be positioned such that an envelope of spray from the nozzles covers substantially the entirety of window 116. In various other examples, the cleaning fluid may be delivered from nozzles 120 below the window, nozzles 120 at the side of the window, from nozzle(s) 120 on wiper assembly 102 (not shown), or from nozzles 120 in or near wiper blade 108.

In some examples, linkage assembly 106 comprises a housing 122 covering a hidden portion 124. Hidden portion 124 comprises links and joints of linkage assembly 106 as is explained in reference to FIG. 6, and shown in dotted line in the figure. Wiper blade 108 may be removably attached to a tip 126 of hidden portion 124. Actuator 110 may be coupled by shaft 112 to a base 128 of hidden portion 124 opposite to tip 126.

In some examples, at least one portion of linkage system 106 has a non-linear shape such that in a resting position (i.e., inoperative position), a field of view of any of optical sensors 114 is not substantially obstructed. The non-linear shape comprises a bend 130 in linkage assembly 106 in many examples. In the example shown in the figure, the resting position of wiper assembly 102 may be toward a top of window 116, proximate to nozzles 120, and as such, bend 130 may be angled appropriately to enable clear vision in the fields of view of optical sensors 114.

Figure 2:
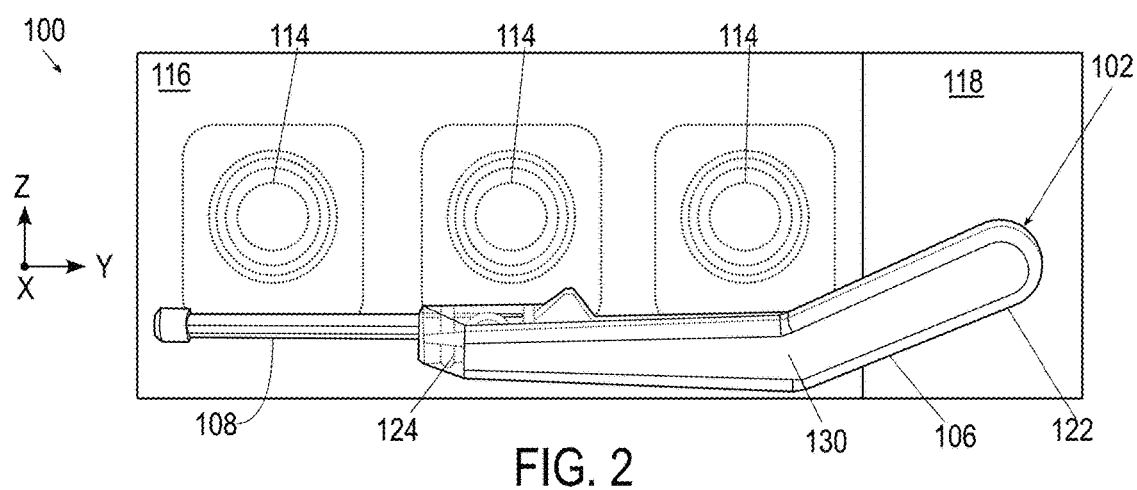
FIG. 2 illustrates a simplified front view of another example apparatus for a parallel motion window wiper in an AV.

FIG. 2 illustrates a simplified front view of apparatus 100. In the example shown in the figure, the resting position of wiper assembly 102 may be along another longitudinal edge of window 116 compared to the resting position shown in FIG. 1. In such examples, bend 130 may be a mirror image of bend 130 in the example of FIG. 1. Various parts of linkage assembly 106 may be enclosed and hidden inside housing 122. Such hidden parts form part of hidden portion 124. Optical sensors 114 may be arranged linearly along the Y-axis, and wiper blade 108 may traverse along the Z-axis during wiping operations.

Figure 3:
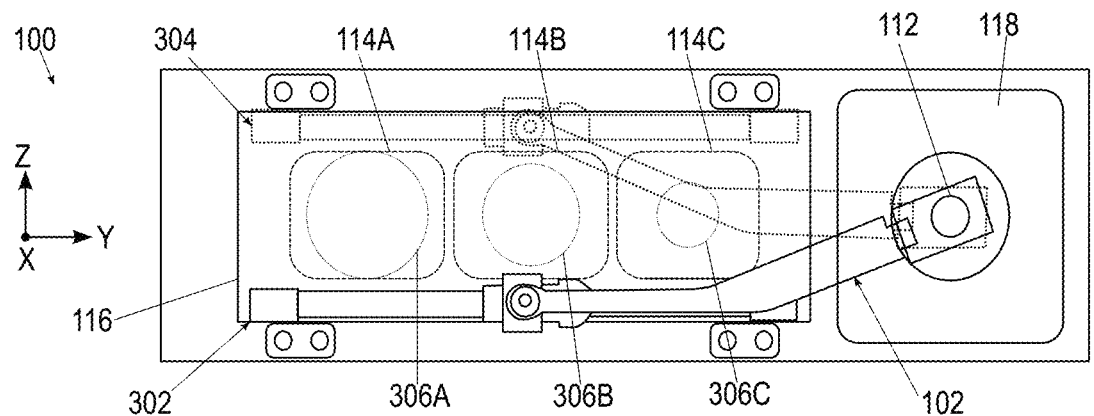
FIG. 3 illustrates a simplified front view of various operational configurations of an example apparatus for a parallel motion window wiper in an AV.

FIG. 3 illustrates a simplified front view of various operational configurations of apparatus 100. During wiping operations, wiper blade 108 may traverse a certain range of distance between a resting position 302 and an opposing position 304. In the example illustrated, resting position 302 may be toward a bottom of window 116 and position 304 may be toward a top of window 116. Other configurations are also possible within the broad scope of the examples discussed herein.

Each optical sensor 114 may have a respective field of view 306. For example, optical sensor 114A may have field of view 306A; optical sensor 11413 may have field of view 306B; optical sensor 114C may have field of view 306C. In some examples, fields of view 306 of different optical sensors 114 may be the same; in other examples (as shown), fields of view 306 of different optical sensors 114 may be different. For example, field of view 306A may be larger than field of view 306B, which in turn may be larger than field of view 306C. Optical sensors 114A-114C may be arranged such that the one with the largest field of view is farthest from shaft 112 (and consequently actuator 110 and/or chassis 118) of wiper assembly 102. Thus, in the example shown, optical sensor 114A is farthest from shaft 112; optical sensor 114C with the smallest field of view 306C is closest to shaft 112. Such a configuration may be advantageous in enabling an unobstructed field of view when wiper assembly 102 is in resting position 302.

Figure 4:
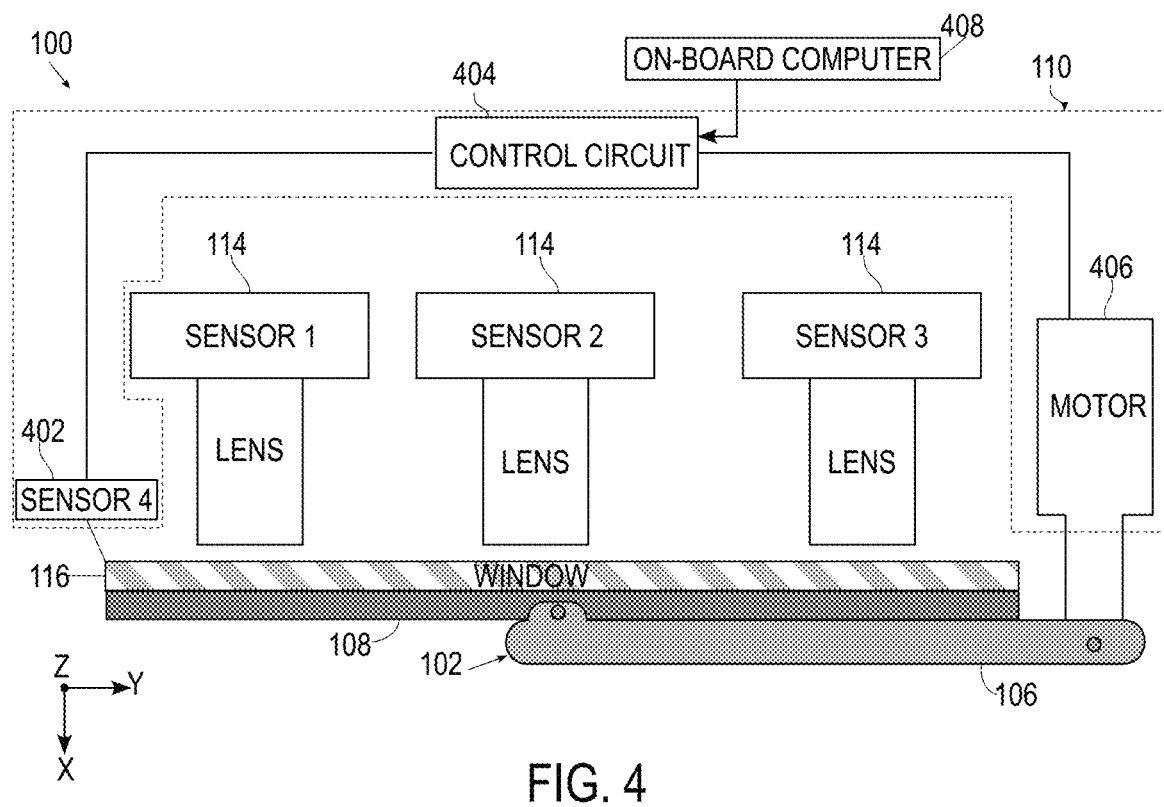
FIG. 4 illustrates a simplified block diagram of an example apparatus for a parallel motion window wiper in an AV.

FIG. 4 illustrates a simplified block diagram of apparatus 100. In various examples, optical sensors 114 may be placed at the same distance away from window 116. In other examples, optical sensors 114 may be placed at varying distances from window 116, depending on the focal points of respective lens and other components of optical sensors 114. In some examples (as shown), optical sensors 114 and actuator 110 are located along parallel axes. In some examples, optical sensors 114 and actuator 110 are located along collinear axes.

In various examples, another sensor 402 may be coupled to window 116 and may be configured to detect fluid (and/or other obstruction) on window 116. In some examples, sensor 402 may include an encoder that can sense an angular position of wiper blade 108. In yet other example, sensor 402 may be one of optical sensors 114. Sensor 402 may be coupled to a control circuit 404 which may be communicatively coupled with a motor 406. In some examples, motor 406 may be a rotary motor. When motor 406 is powered on, linkage assembly 106 may rotate, causing wiper blade 108 to translate across window 116. In some examples, sensor 402 may check for fluid, contaminants and/or other obstruction on window 116. If contamination is detected, sensor 402 may send a signal to control circuit 404, which may maintain power to motor 406. If fluid is not detected, sensor 402 may send another signal to control circuit 404, which may power off motor 406.

In some examples, control circuit 404 may also receive configuration, position, and operating instructions from an external on-board computer 408. For example, control circuit 404 may receive position, acceleration, and/or velocity commands from on-board computer 408; control circuit 404 may compare the received information with the current position read by encoder in sensor 402; based on the comparison, control circuit 404 may apply a voltage to motor 406 until the position read by the encoder is within tolerances of a predetermined position as specified in the instructions from on-board computer 408. In some examples, sensor 402, control circuit 404, and motor 406 form an integral part of actuator 110, such as in servomotor systems. In other examples, each of sensor 402, control circuit 404 and motor 406 may be separate components, and actuator 110 in such examples may include only motor 406 (and other related components as applicable). Note that various other components such as gearheads, valves, etc. may be present in the system, but are not shown in the drawings merely for ease of illustration.

In some examples, sensor 402 may be continuously or intermittently in a detection mode. In the detection mode, sensor 402 may inspect window 116 for fluid, contaminants, and/or other obstruction. Thus, when it rains, sensor 402 may detect rainwater on window 116. When window 116 becomes dirty or muddy or covered partly or wholly with an obstruction, sensor 402 may detect as such. In such scenarios, sensor 402 may send the appropriate signal to control circuit 404. Thereupon, control circuit 404 may power on motor 406. In some examples, control circuit 404 and/or sensor 402 may be configured to distinguish between rainwater and dirt (or other obstructions). In the latter scenario, control circuit 404 may turn on nozzles 120, which may spray fluid, such as cleaning fluid, on window 116. Thereupon, sensor 402 may detect fluid on window 116, and send the appropriate signal to control circuit 404, which may power on actuator 110 and continue wiping operations thereafter as discussed above. Various other operating modes are possible within the broad scope of the examples disclosed herein.

Figure 5:
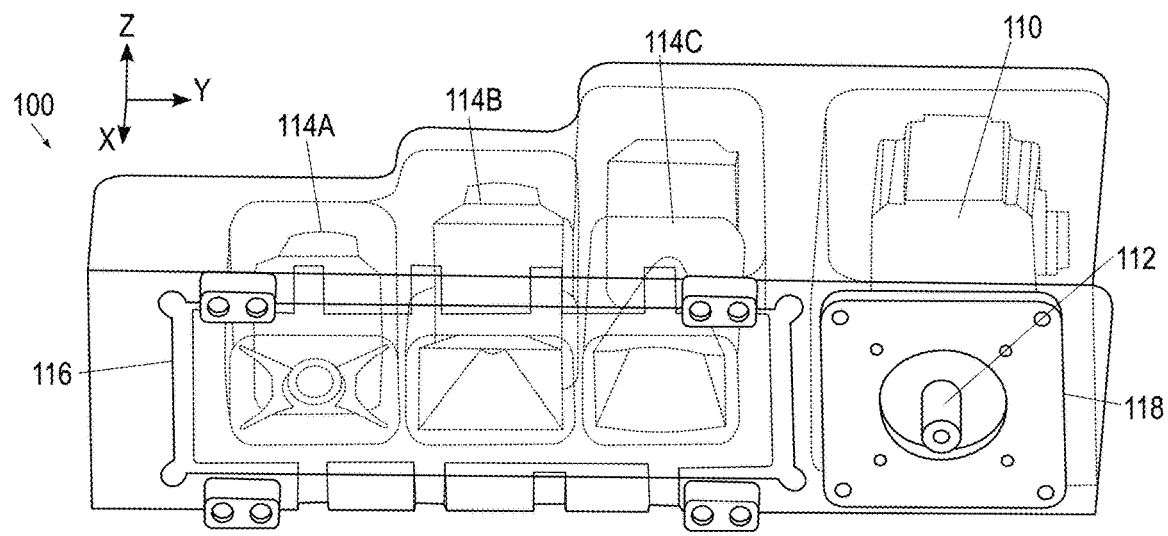
FIG. 5 illustrates a simplified perspective diagram of portions of an example apparatus for a parallel motion window wiper in an AV.

FIG. 5 illustrates a simplified perspective diagram of portions of apparatus 100. In the example shown wiper assembly 102 is not shown; optical sensors 114A-114C are arranged at varying distances from window 116, depending on their respective functionalities, operating specifications, component capabilities and other factors beyond the scope of the discussion herein. Actuator 110 may be arranged parallel to optical sensors 114A-114C in a lateral space as shown. Window 116 may be coplanar in some examples with a base of shaft 112, where shaft 112 connects to actuator 110. Actuator 110 may be coupled to chassis 118, and shaft 112 may protrude outwards through a hole in chassis 118.

Figure 6:
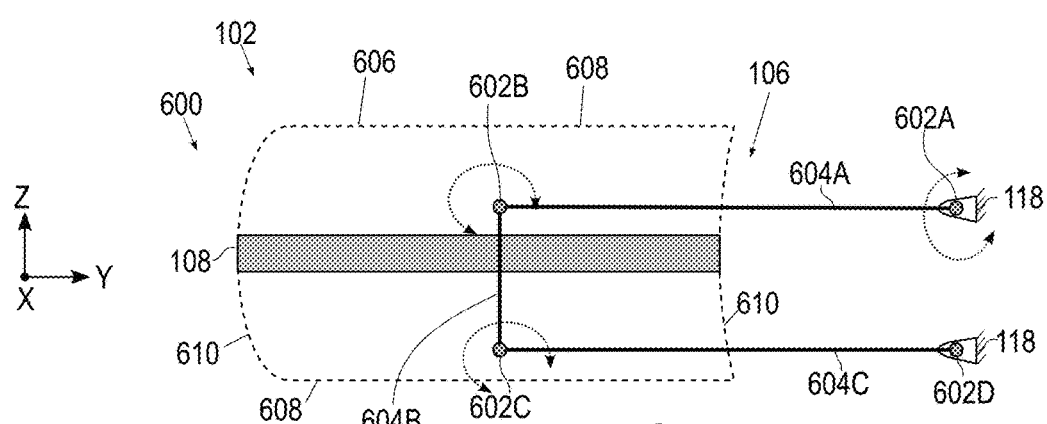
FIG. 6 illustrates a simplified diagram of an example four-bar linkage mechanism for a parallel motion window wiper in an AV.

FIG. 6 illustrates a simplified diagram of an example four-bar linkage mechanism 600 that schematically represents wiper assembly 102. Linkage mechanism 600 includes four joints 602A-602D, three movable links 604A-604C, and one immovable link corresponding to chassis 118. Wiper blade 108 is coupled to movable link 60413. Movable link 604A is coupled on a first end and an opposing second end to joint 602A and joint 60213, respectively. Movable link 60413 is coupled on a first end and an opposing second end to joint 60213 and joint 602C, respectively. Movable link 604C is coupled on a first end and an opposing second end to joint 602C and joint 602D, respectively. Each joint 602A-602D are rotary joints, which can rotate freely around a shaft, pin, or other such mechanism. Joints 602A and 602D are coupled to the immovable link corresponding to chassis 118. In some implementations, joint 602A may coincide with joint 602D, for example, both may be a common pin fixed to chassis 118. In other implementations, joint 602A may not coincide with joint 602D, for example, joint 602A may be a pin connected to chassis 118, and joint 602D may be another pin connected to the frame around sensors 114 (or other fixed member).

In particular examples, joint 602A may correspond to shaft 112. Shaft 112 is coupled to chassis 118 by way of actuator 110, which is fixed to chassis 118. Joint 602A may be driven by actuator 110 (i.e., movable link 604A may be rotated around joint 602A by actuator 110. Joint 602D may not be driven and may merely be a fixed pin that allows movable link 604C to rotate relative to it. Movable links 604A and 60413 are part of hidden portion 124 of linkage assembly 106. Movable link 604C corresponds to housing 122 of linkage assembly 106. In some examples, joints 602A-602C may comprise ball bearings. In some other example, joints 602A-602C may be spherical joints. In other examples, joints 602A-602C may comprise other kinds of bearings and/or rotary joints.

In various examples, the configuration of linkage mechanism 600 allows wiper blade 108 to wipe a planar area 606 during wiping operations. For example, movable link 604A may rotate around joint 602A, which in turn causes movable link 60413 to rotate around joints 60213 and 602C, which in turn causes movable link 604C to rotate around joints 602C and 602A, causing wiper blade 108 attached to movable link 60413 to sweep planar area 606. Planar area 606 has longitudinal edges 608 that are linear and parallel to the linear axis along which optical sensors 114 are aligned, for example, along Y-axis; in other examples, longitudinal edges 608 are linear and parallel to longitudinal edges of window 116. Planar area 606 has transverse edges 610 that are curvilinear and orthogonal to the linear axis (or longitudinal edges of window 116), for example, along Z-axis. In examples where wiper blade 108 is as long as window 116 (longitudinally, e.g., along Y-axis), longitudinal edges 608 are as long. In some examples, wiper blade 108 (and consequently longitudinal edge 608 and window 116 are approximately 6 to 8 inches in length measured along the Y-axis. In examples where wiper blade 108 traverses across a substantial portion of window 116, for example, the entirety of window 116, transverse edges 610, not accounting for the curved perimeters, are substantially as long as window 116 is wide (e.g., measured along the Z-axis).

Figure 7:
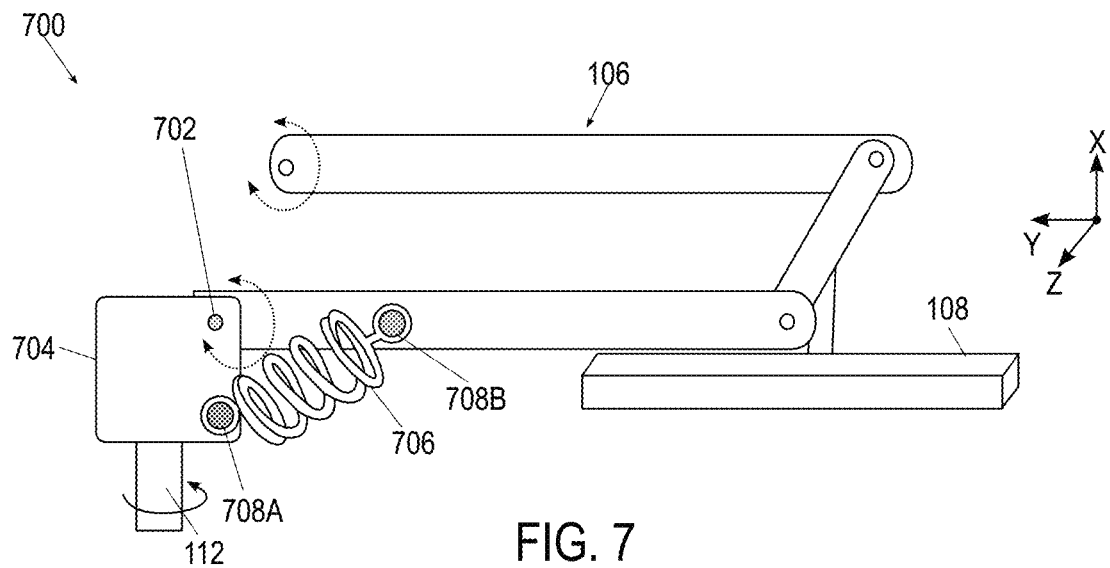
FIG. 7 illustrates a simplified diagram of an example spring mechanism for a parallel motion window wiper in an AV.

FIG. 7 illustrates a simplified diagram of an example spring mechanism 700 of apparatus 100. In the configuration shown, window 116 (not shown) is in the YZ plane such that the X-axis is perpendicular to the surface of window 116. Linkage assembly 106 rotates by virtue of pin 702 around the Z-axis. Spring apparatus 700 further comprises a structure 704 attached or coupled to pin 702 such that structure 704 rotates with pin 702. Structure 704 is coupled to shaft 112 of actuator 110 (not shown). A spring 706 is attached on one end 708A to structure 704 and on another end 70813 to linkage assembly 106 such that spring 706 can rotate around each of its mounts 708A and 70813. During wiping operations, as linkage assembly 106 and structure 704 rotates synchronously by virtue of rotating shaft 112, spring 706 also rotates therewith.

In various examples, spring 706 is pre-stretched in a direction in the XY plane such that spring 706 continually exerts a tensile force along its length on linkage assembly 106, pulling wiper blade 108 against window 116. Wiper blade 108 consequently remains in contact with the surface of window 116. In other words, spring 706 prevents linkage assembly 106 and wiper blade 108 from moving away from window 116. Spring 706 also facilitates lifting linkage assembly 106 away from window 116, for example, to remover wiper blade 108. In such embodiments, rotary joints of linkage assembly 106, particularly joints 602A and 602D as described in reference to FIG. 6, may be spherical joints. Note that in some examples where spring 706 is not used, linkage assembly 106 may be made of materials that have certain amount of elasticity (e.g., flexion) so that linkage assembly 106 may be rotated or lifted away from window 116 to remove wiper blade 108.

Figure 8:
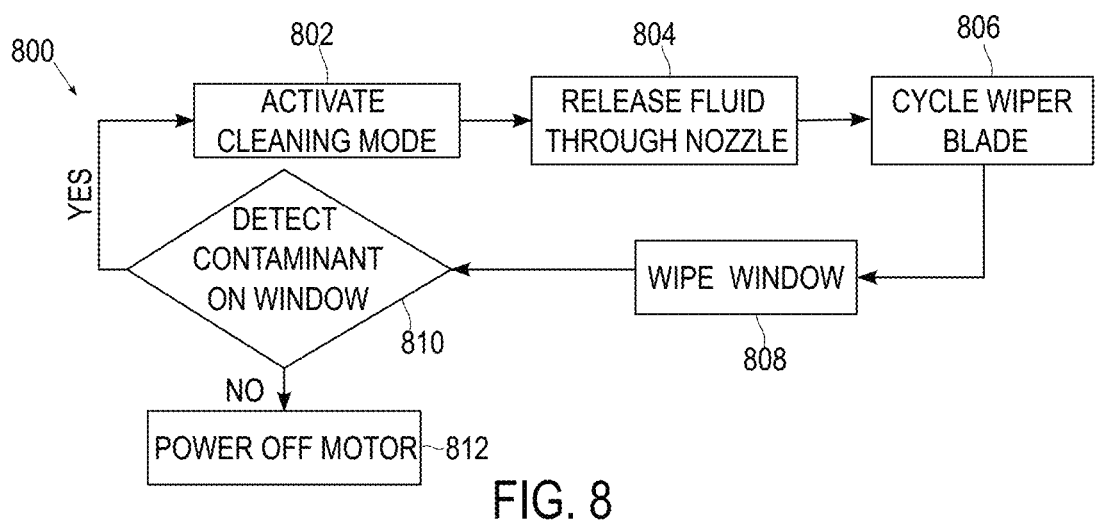
FIG. 8 is a simplified flow diagram illustrating example operations of an example system for a parallel motion window wiper in an AV.

FIG. 8 is a simplified flow diagram illustrating example operations 800 of apparatus 100 that may be performed by various components of apparatus 100. At 802, actuator 110 is powered on and one or more cleaning modes may be activated. In some examples, the cleaning mode activated may be based on contaminant type (e.g., dust and debris may trigger one cleaning mode; rainwater may trigger another cleaning mode). In some other examples, the cleaning mode activated may be based on contaminant amount (e.g., small amounts of contaminants may trigger one cleaning mode; large amounts of contaminants may trigger another cleaning mode). Various factors beyond the scope of the present disclosure may determine the choice of cleaning mode. At 804, electric solenoid valves may be opened, releasing fluid (e.g., cleaning fluid) through one or more nozzle 120. In some examples, the fluid may be released such that it sprays on window 116. At 806, wiper blade 108 may be moved from a parked position and cycled through one or more speeds (e.g., slow, intermittent, fast, etc.) so as to wipe fluid and wash away contaminants from window 116 at 808. At 810, sensor 402 may check for fluid, contaminants, and/or other obstruction on window 116. In some embodiments, sensor 402 may be continuously or intermittently in a detection mode at 810. In the detection mode, sensor 402 may inspect window 116 for fluid, contaminants, and/or other obstruction continuously, intermittently, or upon completion of tasks by other components in apparatus 100. For example, when it rains, sensor 402 may detect rainwater on window 116. When window 116 becomes dirty or muddy or covered partly or wholly with an obstruction, sensor 402 may detect as such. In some examples, control circuit 404 and/or sensor 402 may be configured to distinguish between rainwater and dirt (or other obstructions). In the latter scenario, control circuit 404 may turn on nozzles 120, which may spray fluid, such as cleaning fluid, on window 116. Thereupon, sensor 402 may detect fluid on window 116.

If fluid and/or contaminants are detected (e.g., by a perception system of which sensor 402 is part in some examples), sensor 402 may send a signal to control circuit 404, which may maintain power to motor 406 at 802, maintaining the cleaning mode. If fluid and/or contaminants is not detected (i.e., window 116 is clean), sensor 402 may send another signal to control circuit 404, which may power off motor 406 of actuator 110 at 812. In some scenarios, multiple cycles or fluid spray and wiping may be needed depending on contaminant type. Various other operating modes are possible within the broad scope of the examples disclosed herein.

Figure 9A:
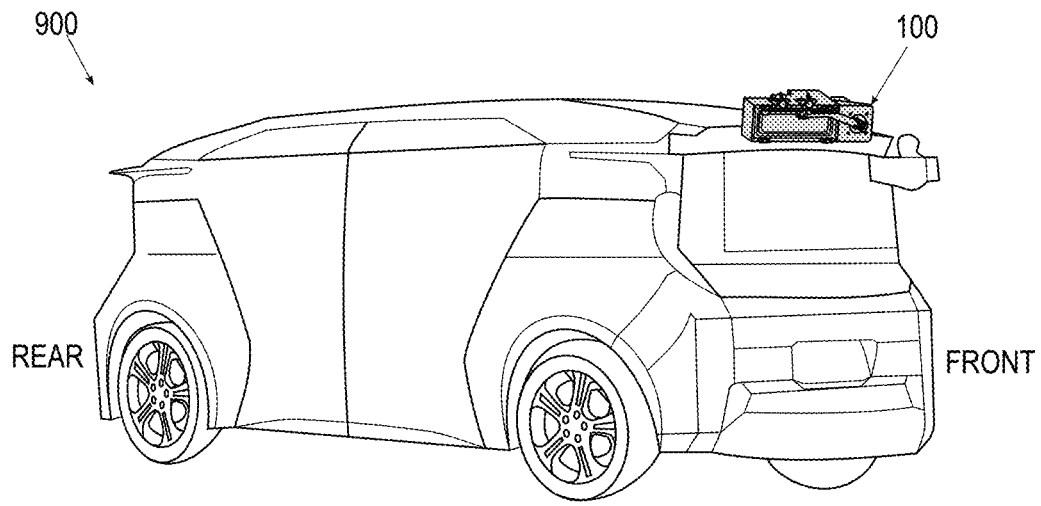
FIGS. 9A and 9B are schematic representations of an AV with an example system comprising a parallel motion window wiper, according to some examples of the present disclosure.
Figure 9B:
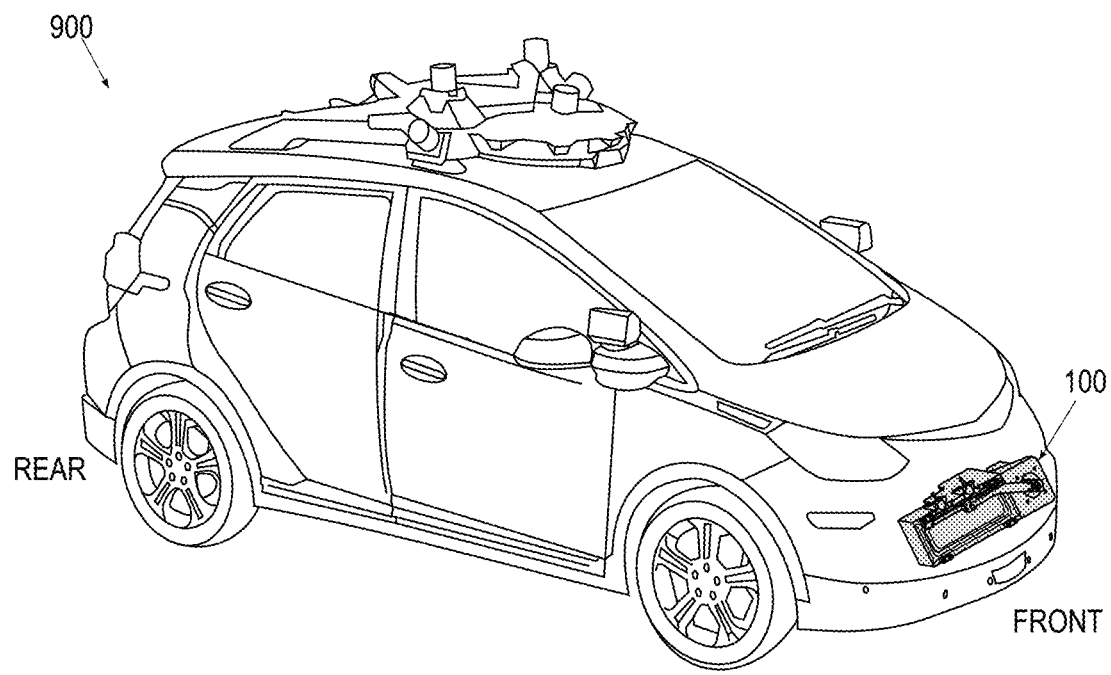

FIGS. 9A and 9B are schematic representations of an AV 900 with apparatus 100 attached thereto. FIG. 9A shows apparatus 100 mounted on the front top side of AV 900, on a roof region, for example. Although only apparatus 100 is shown in isolation, it may be understood that various other components not shown may be coupled to apparatus 100 on the front top side of AV 900.

FIG. 9B shows apparatus 100 coupled to a front bottom side of AV 900, proximate to, or embedded in a bumper region, for example. The particular example of AV 900 in FIG. 9B is different from the example of FIG. 9A. Any suitable vehicle may be used as AV 900 according to the broad scope of the present disclosure. In yet other examples (not shown), apparatus 100 may be located at a rear of AV 900, either in the bumper region or on the roof. In yet other examples, apparatus 100 may be located anywhere around AV 900 according to desired configurations, based on particular needs. Note that the example AV 900 shown is a coupe; any suitable vehicle may be encompassed within the broad scope of the examples of AV 900.

SELECTED EXAMPLES

Example 1 provides an apparatus (e.g., 100, FIG. 1), comprising: a wiper assembly (e.g., 102), including: a linkage assembly (e.g., 106); a wiper blade (e.g., 108) removably attached to the linkage assembly; and a actuator (e.g., 110) coupled to the linkage assembly and configured to enable rotation of the linkage assembly around a shaft (e.g., 112); and a sensor assembly (e.g., 104), including: a plurality of optical sensors (e.g., 114) arranged along a linear axis (e.g., Y-axis); and a window (e.g., 116) between the plurality of optical sensors and the wiper assembly, in which: the wiper blade is longitudinally oriented parallel to the linear axis, and the wiper blade is configured to translate in a direction (e.g., Z-axis) perpendicular to the linear axis while maintaining contact with the window during translation.

Example 2 provides the apparatus of claim 1, in which (e.g., FIG. 3) at least one portion of the linkage assembly has a non-linear shape (e.g., 130) such that in a resting position (e.g., 302) of the linkage assembly, a field of view (e.g., 306, FIG. 3) of any of the optical sensors is not substantially obstructed.

Example 3 provides the apparatus of claim 2, in which the non-linear shape comprises a bend (e.g., 130) in the linkage assembly.

Example 4 provides the apparatus of any one of claims 2-3, in which the respective field of view of various sensors are different.

Example 5 provides the apparatus of claim 4, in which the sensors in the plurality of sensors are arranged such that sensors with larger fields of view are farther from the actuator than sensors with smaller fields of view.

Example 6 provides the apparatus of any one of claims 1-5, in which the optical sensors comprise at least one of optical cameras and LIDAR sensors.

Example 7 provides the apparatus of any one of claims 1-6, in which (e.g., FIG. 1): the linkage assembly comprises a housing (e.g., 122) covering a hidden portion (e.g., 124), the wiper blade is removably attached to a first end (e.g., 126) of the hidden portion, and the actuator is coupled to a second end (e.g., 128) of the hidden portion opposite to the first end.

Example 8 provides the apparatus of claim 7, in which (e.g., FIG. 6): the linkage assembly comprises four joints (e.g., 602A-602D), three movable links (e.g., 604A-604C), and one immovable link (e.g., 118), and the wiper blade is coupled to one of the three movable links.

Example 9 provides the apparatus of claim 8, in which: a first movable link (e.g., 604A) of the three movable links is coupled on a first end of the first movable link and an opposing second end of the first movable link to a first joint (e.g., 602A) of the four joints and to a second joint (e.g., 602B) of the four joints, respectively, a second movable link (e.g., 604B) of the three movable links is coupled on a first end of the second movable link and an opposing second end of the second movable link to the second joint (e.g., 602B) of the four joints and a third joint (e.g., 602C) of the four joints, respectively, a third movable link (e.g., 604C) of the three movable links is coupled on a first end of the third movable link and an opposing second end of the third movable link to the third joint (e.g., 602C) of the four joints and to a fourth joint (e.g., 602A) of the four joints, respectively, and the first joint (e.g., 602A) and the fourth joint are coupled to the immovable link.

Example 10 provides the apparatus of claim 9, in which: the first movable link and the second movable link are part of the hidden portion of the linkage assembly, the third movable link is the housing covering the hidden portion, and the immovable link is a chassis enclosing the actuator.

Example 11 provides the apparatus of any one of claims 9-10, in which: the wiper blade is removably attached to the second movable link.

Example 12 provides the apparatus of claim 11, in which: the wiper blade is configured to wipe a planar area (e.g., 606), longitudinal edges (e.g., 608) of the planar area are linear and parallel to the linear axis, and transverse edges (e.g., 610) of the planar area are curvilinear and orthogonal to the linear axis.

Example 13 provides the apparatus of claim 12, in which: the wiper blade is substantially as long as the window measured in a direction parallel to the linear axis, and the transverse edges of the planar area are substantially as long as the window is wide measured in another direction orthogonal to the linear axis.

Example 14 provides the apparatus of claim 13, in which the wiper blade and the window are approximately 6 to 8 inches in length measured in a direction parallel to the linear axis.

Example 15 provides the apparatus of any one of claims 8-14, in which the four joints comprise rotary joints including ball bearings.

Example 16 provides the apparatus of any one of claims 1-15, further comprising a spring (e.g., 706), in which (e.g., FIG. 7): a first end of the spring is coupled to the shaft, and a second opposing end of the spring is coupled to the linkage assembly.

Example 17 provides the apparatus of claim 16, in which the first end of the spring is attached to a structure (e.g., 704) that is configured to rotate with the shaft.

Example 18 provides the apparatus of any one of claims 16-17, in which the spring is configured to exert a force on the linkage assembly in a direction perpendicular to a plane of the window and toward the window such that the wiper blade maintains contact with the window during translation.

Example 19 provides the apparatus of any one of claims 1-18, further comprising (e.g., FIG. 1) a chassis (e.g., 118) enclosing the actuator, in which the chassis is immobile relative to the linkage assembly.

Example 20 provides the apparatus of any one of claims 1-19, in which (e.g., FIG. 9) the apparatus is configured to be coupled to a front of an AV (e.g., 900).

Example 21 provides a system (e.g., 100), comprising: a vehicle; a sensor assembly comprising optical sensors of the vehicle, the optical sensors being encased in a box including an window facing a front of the vehicle; a wiper assembly (e.g., 102) coupled to the sensor assembly, the wiper assembly including: a linkage assembly (e.g., 106); a wiper blade (e.g., 108) removably attached to the linkage assembly and configured to be in contact with the window; and an actuator (e.g., 110) coupled to the linkage assembly and configured to enable rotation of the linkage assembly.

Example 22 provides the system of claim 21, in which: the optical sensors are arranged along a first axis, the wiper blade is longitudinally oriented parallel to the first axis, and the wiper blade is configured to translate in a direction perpendicular to the first axis.

Example 23 provides the system of claim 22, in which a range of motion of the wiper blade perpendicular to the first axis is configured to sweep across a width of the window.

Example 24 provides the system of any one of claims 21-23, in which a shape of the linkage assembly is such that in an inoperative position of the linkage assembly, fields of view of the optical sensors are not obstructed.

Example 25 provides the system of claim 24, in which: the linkage assembly comprises a plurality of links, and the shape of the linkage assembly includes a bend in one of the links such that the fields of view are not obstructed in the inoperative position of the linkage assembly.

Example 26 provides the system of any one of claims 24-25, in which (e.g., FIG. 3): the optical sensors include a first optical sensor (e.g., 114A), a second optical sensor (e.g., 11413), and a third optical sensor (e.g., 114C), having respectively, a first field of view (e.g., 306A), a second field of view (e.g., 306B), and a third field of view (e.g., 306C), the first field of view is larger than the second field of view, the second field of view is larger than the third field of view, the first optical sensor is farthest from the actuator, and the third optical sensor is closest to the actuator.

Example 27 provides the system of any one of claims 21-26, in which (e.g., FIG. 5) the optical sensors are at varying distances from the window.

Example 28 provides the system of claim 27, in which the optical sensors and the actuator are located along parallel axes.

Example 29 provides the system of any one of claims 21-28, further comprising nozzles (e.g., 120) configured to spray fluid on the window.

Example 30 provides the system of claim 29, in which the wiper assembly is synchronized with the nozzles such that after the nozzle sprays the fluid, the wiper assembly is configured to power on and operate the wiper blade to wipe the fluid from the window.

Example 31 provides a method for operating a wiper assembly of a vehicle, comprising: activating a cleaning mode; powering on a motor; releasing fluid through a nozzle; and cycling a wiper blade according to the cleaning mode such that fluid is wiped from a window of a sensor assembly, the window being in contact with the wiper blade, in which: the sensor assembly comprises a plurality of optical sensors (e.g., 114) arranged along a linear axis (e.g., Y-axis), the window (e.g., 116) being between the plurality of optical sensors and the wiper blade, the wiper blade is longitudinally oriented parallel to the linear axis, and the wiper blade is configured to translate in a direction (e.g., Z-axis) perpendicular to the linear axis while maintaining contact with the window during translation.

Example 32 provides the method of claim 31, in which the wiper blade is coupled to a linkage assembly, the motor is a rotary motor, and the linkage assembly is coupled to the motor by a shaft.

Example 33 provides the method of any one of claims 31-32, in which the wiper blade is coupled to a linkage assembly, the linkage assembly comprising a housing (e.g., 122) covering a hidden portion (e.g., 124), the wiper blade is removably attached to a tip (e.g., 126) of the hidden portion, and the motor is coupled to a base (e.g., 128) of the hidden portion opposite to the tip.

Example 34 provides the method of any one of claims 31-33, further comprising: detecting fluid on the window; if fluid is detected, at least one of powering on the motor and maintaining power to the motor; and if fluid is not detected, powering off the motor.

Example 35 provides the method of claim 34, in which the fluid is rainwater.

Example 36 provides the method of claim 34, in which the fluid is cleaning liquid.

Example 37 provides the method of claim 36, further comprising spraying the cleaning liquid on the window.

Example 38 provides the method of claim 37, in which the fluid is sprayed by the nozzle, and the nozzle is part of a plurality of nozzles arranged on a longitudinal edge of the window, the longitudinal edge being parallel to the linear axis.

Example 39 provides the method of claim 38, in which the wiper blade is configured to be located on another longitudinal edge of the window when the motor is not powered on.

Example 40 provides the method of any one of claims 31-39, in which the linkage mechanism comprises a shape configured to not obstruct fields of view of the optical sensors.

The various examples described above are provided by way of illustration only and should not be construed to limit the scope of the disclosure. For example, the principles herein apply equally to optimization as well as general improvements. Various modifications and changes may be made to the principles described herein without following the example examples and applications illustrated and described herein, and without departing from the spirit and scope of the disclosure. Claim language reciting "at least one of" a set indicates that one member of the set or multiple members of the set satisfy the claim.

What is claimed is:
1. An apparatus, comprising:
   a wiper assembly, including:
      a linkage assembly;
      a wiper blade removably attached to the linkage assembly; and an actuator coupled to the linkage assembly and configured to enable rotation of the linkage assembly around a shaft; and a sensor assembly, including:
- a plurality of optical sensors arranged along a linear axis; and
- a window between the plurality of optical sensors and the wiper assembly, wherein:
  - the wiper blade is longitudinally oriented parallel to the linear axis,
  - the wiper blade is configured to translate in a direction perpendicular to the linear axis while maintaining contact with the window during translation,
  - the actuator is adjacent to the sensor assembly along the linear axis, and
  - the linkage assembly extends between the actuator and the wiper longitudinally at least partially across the window.

2. The apparatus of claim 1, wherein at least one portion of the linkage assembly has a non-linear shape such that in a resting position of the linkage assembly, a field of view of any of the optical sensors is not substantially obstructed.

3. The apparatus of claim 1, wherein:
the linkage assembly comprises a housing covering a hidden portion,
the wiper blade is removably attached to a first end of the hidden portion, and
the actuator is coupled to a second end of the hidden portion opposite to the first end.

4. The apparatus of claim 3, wherein:
the linkage assembly comprises four joints, three movable links, and one immovable link, and
the wiper blade is coupled to one of the three movable links.

5. The apparatus of claim 4, wherein:
a first movable link of the three movable links is coupled on a first end of the first movable link and an opposing second end of the first movable link to a first joint of the four joints and to a second joint of the four joints, respectively,
a second movable link of the three movable links is coupled on a first end of the second movable link and an opposing second end of the second movable link to the second joint of the four joints and a third joint of the four joints, respectively,
a third movable link of the three movable links is coupled on a first end of the third movable link and an opposing second end of the third movable link to the third joint of the four joints and to the first joint of the four joints, respectively, and
the first joint is coupled to the immovable link.

6. The apparatus of claim 5, wherein:
the first movable link and the second movable link are part of the hidden portion of the linkage assembly,
the third movable link is the housing covering the hidden portion, and
the immovable link is a chassis enclosing the actuator.

7. The apparatus of claim 5, wherein:
the wiper blade is configured to wipe a planar area,
longitudinal edges of the planar area are linear and parallel to the linear axis, and
transverse edges of the planar area are curvilinear and orthogonal to the linear axis.

8. The apparatus of claim 1, further comprising a spring, wherein:
a first end of the spring is coupled to the shaft, and a second opposing end of the spring is coupled to the linkage assembly.

9. The apparatus of claim 8, wherein the spring is configured to exert a force on the linkage assembly in a direction perpendicular to a plane of the window and toward the window such that the wiper blade maintains contact with the window during translation.

10. The apparatus of claim 1, further comprising a chassis enclosing the actuator, wherein the chassis is immobile relative to the linkage assembly.

11. The apparatus of claim 1, wherein the apparatus is configured to be coupled to a front of an autonomous vehicle.

12. A system, comprising:
a vehicle;
a sensor assembly comprising optical sensors of the vehicle, the optical sensors being encased in a box including a window facing a front of the vehicle;
a wiper assembly coupled to the sensor assembly, the wiper assembly including:
- a linkage assembly;
- a wiper blade removably attached to the linkage assembly and configured to be in contact with the window; and
- an actuator coupled to the linkage assembly and configured to enable rotation of the linkage assembly, wherein:
  - the actuator is adjacent to the sensor assembly in a longitudinal direction,
  - the wiper blade is to translate across the window perpendicular to the longitudinal direction, and
  - the linkage assembly extends between the actuator and the wiper blade longitudinally at least partially across the window.

13. The system of claim 12, wherein:
the optical sensors are arranged along a first axis,
the wiper blade is longitudinally oriented parallel to the first axis, and
the wiper blade is configured to translate in a direction perpendicular to the first axis.

14. The system of claim 13, wherein a range of motion of the wiper blade perpendicular to the first axis is configured to sweep across a width of the window.

15. The system of claim 12, wherein a shape of the linkage assembly is such that in an inoperative position of the linkage assembly, fields of view of the optical sensors are not obstructed.

16. The system of claim 15, wherein:
the optical sensors include a first optical sensor, a second optical sensor, and a third optical sensor, having respectively, a first field of view, a second field of view, and a third field of view,
the first field of view is larger than the second field of view,
the second field of view is larger than the third field of view,
the first optical sensor is farthest from the actuator, and
the third optical sensor is closest to the actuator.

17. A method for operating a wiper assembly of a vehicle, comprising:
activating a cleaning mode;
powering on a motor;
releasing fluid through a nozzle; and
cycling a wiper blade according to the cleaning mode such that fluid is wiped from a window of a sensor assembly, the window being in contact with the wiper blade, wherein:
   the sensor assembly comprises a plurality of optical sensors arranged along a linear axis, the window being between the plurality of optical sensors and the wiper blade,
   the wiper blade is longitudinally oriented parallel to the linear axis,
   the wiper blade is configured to translate in a direction perpendicular to the linear axis while maintaining contact with the window during translation,
   the motor is adjacent to the sensor assembly along the linear axis, and
   a linkage assembly coupling the wiper blade to the motor extends between the motor and the wiper blade longitudinally at least partially across the window.

18. The method of claim 17, wherein:
the wiper blade is coupled to a linkage assembly,
the linkage assembly comprises a housing covering a hidden portion,
the wiper blade is removably attached to a tip of the hidden portion, and
the motor is coupled to a base of the hidden portion opposite to the tip.

19. The method of claim 17, further comprising:
detecting fluid on the window;
if fluid is detected, at least one of powering on the motor and maintaining power to the motor; and
if fluid is not detected, powering off the motor.

20. The method of claim 19, wherein:
the fluid is cleaning liquid,
the method further comprises spraying the cleaning liquid on the window, the fluid being sprayed by the nozzle, and
the nozzle is part of a plurality of nozzles arranged on a longitudinal edge of the window, the longitudinal edge being parallel to the linear axis.

\* \* \* \* \*